March 19, 1940. J. J. O'NEILL ET AL 2,194,318
CLAMP
Filed March 27, 1939
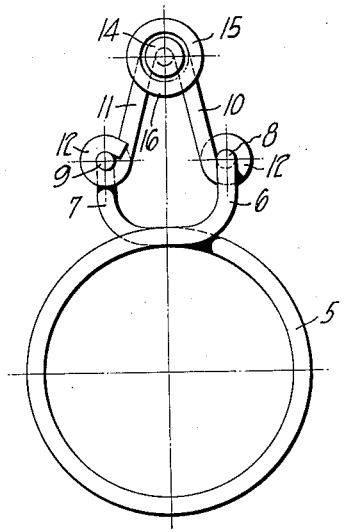
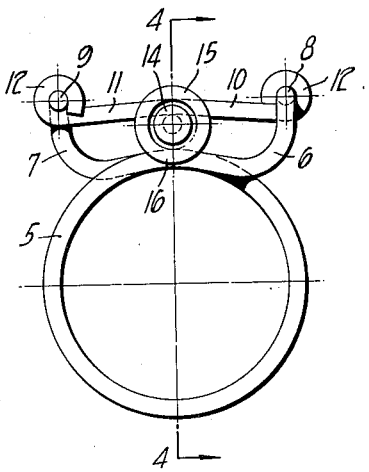
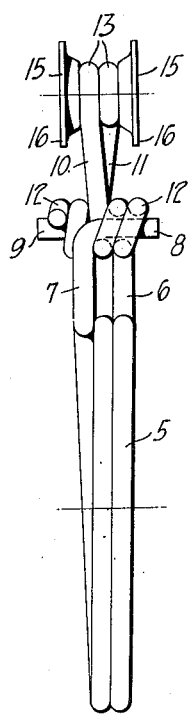
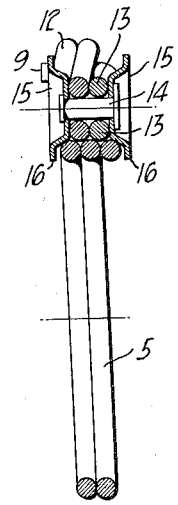
INVENTORS
James J. O'Neill
Maurice C. Cox
BY
ATTORNEY Patented Mar. 19, 1940

2,194,318

UNITED STATES PATENT OFFICE 2,194,318

CLAMP

James J. O'Neill and Maurice C. Cox, Oakland, Calif.

Application March 27, 1939, Serial No. 264,321

3 Claims. (Cl. 24—19)

The present invention relates to clamps adapted for use in connection with tubular or cylindrical members, and particularly adapted for effecting a tight connection between a hose and pipe as, for instance, in the cooling systems of internal combustion engines. The present application discloses an improved form of the clamp disclosed in the application of James J. O'Neill, Serial No. 153,181 filed July 12, 1937.

The aforesaid application discloses a clamp of the character described hereinafter, which may be readily locked in operating position by simple pressure upon the locking element thereof, and including elements having sufficient inherent resiliency to accommodate the clamp to slight variations in the diameter of the objects to be clamped thereby, without substantially affecting the tightness of the seal effected as, for instance, between a pipe and a hose clamped thereby.

The principal object of the present invention is to provide a clamp of the character described, the principal parts of which may be formed entirely of wire subjected only to bending and coiling operations which may be done by automatic machinery at low cost.

A further, and important object of the invention, is to provide a clamp of the character described which will present an inherently rigid structure when locked in its operating position so as to avoid distortion and displacement thereof from such operating position.

The novel features characteristic of the invention are set forth with particularity in the appended claims. The invention itself, however, together with additional objects and advantages thereof, will best be understood from the following description of a specific embodiment when read in connection with the accompanying drawing, in which:

Figure 1 is a front elevation of a clamp embodying the present invention, the same being in open position, ready to be placed over the end of a cylindrical body to be clamped;

Figure 2 is a front elevational view of the clamp of Figure 1, the same being in closed, or locked position;

Figure 3 is a side elevational view of the clamp in the position in which it is shown in Figure 1; and Figure 4 is a vertical, sectional view of the clamp, taken on the line 4—4 of Figure 2.

As illustrated in detail in the accompanying drawing, the clamp of the present invention comprises a helical clamping member 5 preferably formed of spring wire, and adapted to be engaged about an object to be clamped. Resilient arms 6 and 7 extend beyond the helix portion of said helical member, preferably along lines substantially parallel to chords of said helix portion, and are provided adjacent their ends with means for mounting an operating device capable of displacing said extensions in opposite directions to constrict the helix portion of the clamping member.

In the illustrated embodiment the upper ends of arms 6 and 7 are angularly bent as indicated at 8 and 9, respectively, to provide pivotal mountings for toggle links 10 and 11, which, in the interests of economical manufacture, should be made as duplicates, although it is not essential that they be so made. As shown, the links 10 and 11 are duplicates, each having a helical portion 12, by which it may be pivotally mounted upon one of the ends 8 or 9 of the helical clamping member 5, and each having adjacent its opposite end a loop 13 forming an eye through which a rivet 14 extends to secure the links 10 and 11 together for pivotal movement as a toggle linkage.

Also mounted upon a rivet 14 are spaced discs 15, the lower edges 16 of which are spaced apart a sufficient distance to engage over the underlying coils of the helical clamping member 5 so that when the clamp is locked in its operating position, as shown in Figure 2, the disc 15 will secure the toggle linkage comprising links 10 and 11 against displacement axially of the helical clamping member 5, and also prevent spreading or unwrapping of the coils of the helix member 5, which might otherwise be effected by displacement of one end of the toggle linkage.

In applying the present clamp to an object such as, for instance, a section of hose used to connect the water jacket of an internal combustion engine with its radiator or water pump, the toggle linkage comprising links 10 and 11 is first adjusted to the position in which it is shown in Figure 1. The section of hose is then inserted through the helical clamping member 5, one of the clamps being disposed adjacent each end of the hose section. After the hose section has been placed over the tubular members which it is desired to connect, each clamp is adjusted along the hose to a position in which it encircles both a portion of the hose and a portion of one of said tubular members, and the knee of the toggle linkage comprising links 10 and 11 is depressed to the position in which it is shown in Figure 2.

In this position the rivet 14 which pivotally connects the links 10 and 11 is disposed below a line connecting the angular portions 8 and 9 of the helical clamping member 5, and the eyes 13 of links 10 and 11 press down upon the coils of the member 5. Such depression of the knee of the toggle linkage moves said knee past the dead center position of the toggle linkage, automatically locking the same against retrograde movement toward the position in which it is shown in Figure 1. At the same time movement of the toggle linkage, comprising links 10 and 11, from the position in which the parts are shown in Figure 1 to the position in which they are shown in Figure 2, spreads apart the arms 6 and 7 of the helical member 5, constricting the helix about the hose and bringing the same into tight, sealing relationship with the underlying tubular member.

The resilient arms 6 and 7 extending beyond the helix portion of the member 5, yield during movement of the toggle linkage 10 and 11 from the position shown in Figure 1 to the position shown in Figure 2, in order to permit passage of the knee of the toggle through dead center position, and are maintained under stress to a greater or lesser degree to permit the clamp to adapt itself to slight variations of diameter of the hose. This is an important feature, because it is well known that necessary manufacturing tolerances result in such variations which must be allowed for in any device designed for regular commercial use. The provision of these yieldable members 6 and 7 also avoids the necessity for maintaining extremely close manufacturing tolerances in the production of the several elements of the present clamp, and therefore permits it to be manufactured more economically.

From the foregoing detailed description of a preferred embodiment of the present invention, it will be apparent that the present clamp is readily engageable with the object to be clamped by a simple downward pressure on the knee of the toggle linkage and requires no special tool whatever for such mounting. The clamp may also be disengaged from the clamped object with equal facility. Furthermore, the device is simple in construction and capable of being manufactured without adherence to excessively close manufacturing tolerances, being so constructed as to resiliently adapt itself to the clamped object without requiring any adjustment whatever.

Although a specific embodiment of the invention has been illustrated and described, it will be apparent that the invention may be embodied in various specific forms. It is not, therefore, to be considered as restricted to the form shown, except in so far as is necessitated by the prior art, and by the spirit of the appended claims.

We claim:

1. In a device of the class described, a helical clamping member adapted to be engaged with an object to be clamped and having portions extending beyond the helix portion thereof, a toggle linkage mounted on said extending portions, comprising a knee movable through dead center position to lock said device in clamping position, and means mounted adjacent the knee of said toggle linkage for retaining said clamping member against spreading and unwrapping when said device is adjusted to locked position.

2. In a device of the class described, a helical clamping member adapted to be engaged with an object to be clamped and having portions extending beyond the helix portion thereof, a toggle linkage mounted on said extending portions, comprising a knee movable through dead center position to lock said device in clamping position, and flanged members mounted adjacent the knee of said toggle linkage and adapted to embrace said clamping member when the device is adjusted to locked position to retain said clamping member against spreading.

3. In a device of the class described, a coiled clamping member adapted to be engaged with an object to be clamped and having portions extending beyond the helix portion thereof angularly bent to provide opposite pivotal mountings, toggle links disposed on said pivotal mountings, each of said links having a helical portion disposed on said mounting and an eye adapted for pivotal connection to the eye of the other of said links, means pivotally connecting the eyes of said links adapted to retain all of the coils of said clamping member against unwrapping when said device is adjusted to locked position, and flanged members mounted on said connecting means and adapted to embrace the coils of said clamping member when the device is adjusted to locked position to prevent spreading of said coils.

JAMES J. O'NEILL.
MAURICE C. COX.